July 22, 1958    I. N. MOMTCHILOFF    2,844,132
VALVE-OPERATING MECHANISM FOR OVERHEAD VALVE
INTERNAL COMBUSTION ENGINES
Filed June 25, 1957

Inventor
Ivan N. Momtchiloff
By Scrivener and Parker,
Attorneys

United States Patent Office 2,844,132
Patented July 22, 1958

2,844,132

VALVE-OPERATING MECHANISM FOR OVERHEAD VALVE INTERNAL COMBUSTION ENGINES

Ivan N. Momtchiloff, Detroit, Mich., assignor to The Austin Motor Company Limited, Birmingham, England Application June 25, 1957, Serial No. 667,750

Claims priority, application Great Britain July 6, 1956

3 Claims. (Cl. 123—90)

This invention relates to valve-operating mechanism for overhead valve internal combustion engines, the chief object being to provide a new or improved construction of valve-operating rocker and mounting therefor.

Usually the valve-operating rocker is machined from a steel stamping or forging, and this involves considerable forging tool maintenance and the removal of a comparatively large volume of metal.

According to the present invention, the valve-operating rocker is a steel pressing formed at one end with an arcuate or convex valve contacting portion and at the other with a part-spherical bearing which seats upon a spherical fulcrum the position of which can be adjusted to vary the valve clearance.

The rocker operates as a lever of the third order, the actuating cam operating upon it at a position between the fulcrum and spring-loaded valve stem.

The invention will now be described with reference to the embodiment illustrated in the accompanying drawing, in which.

Figure 1:
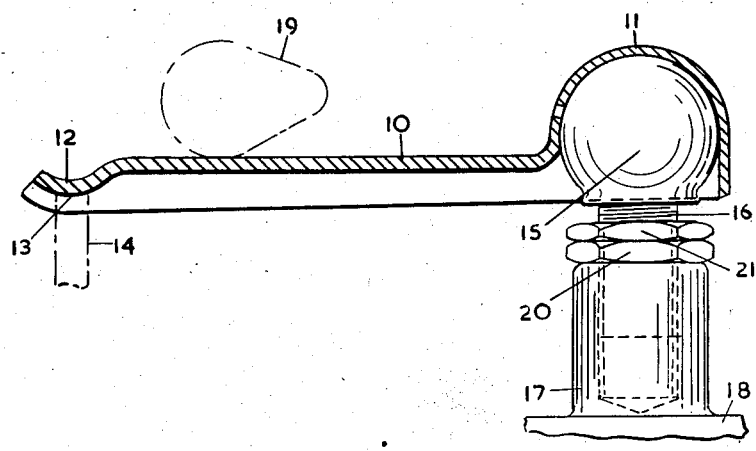
Fig. 1 is a sectional side elevation of the valve-operating mechanism.
Figure 2:
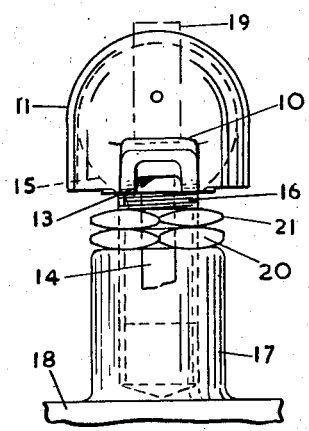
Fig. 2 is an end elevation of the valve-operating rocker.

Referring to the drawing, the valve-operating rocker is a steel pressing comprising a channel section stem portion 10 with a hemispherical bearing or seating 11 at one end and a convex portion 12 at the other end. The rocker is pressed from a flat sheet steel blank comprising a stem portion with an enlarged or disc-like portion at one end, and, in the pressing operation, the disc-like end portion is dished to afford the hemi-spherical bearing or seating 11 and the stem is strengthened or made more rigid by being formed to the channel section 10, the open side of the stem portion and the open side of the hemi-spherical bearing or seating being presented both in the same direction. Also during the pressing operation the end of the stem remote from the hemi-spherical bearing or seating 11 is operated upon to shape the base of the channel section 10 at that end to an arcuate or part-cylindrical form to afford a convex contacting surface 13 for the upper end of the valve stem 14. The depending flanges of the channel section stem 10 of the rocker flank the upper end of the valve stem 14 on opposite sides and therefore serve as guiding or locating means for preventing lateral displacement of the rocker from the valve stem.

The hemi-spherical bearing or seating 11 fits over a spherical fulcrum or ball 15 having a screwed stem 16 which screws into a vertical bore in a boss 17 cast at an appropriate position on the cylinder head 18, so that by screwing said ball 15 up or down the angular position of the rocker stem portion 10 in relation to the actuating cam 19 can be adjusted to vary the valve clearance as may be necessary. The screw stem 16 is fitted with an adjusting nut 20 and a lock nut 21.

It will be seen that the valve rocker operates as a lever of the third order, the actuating cam operating upon the rocker stem portion 10 at a position between the fulcrum ball 15 and the valve stem 14.

If found to be necessary or desirable, the portion of the rocker which is operated upon by the cam may be provided with a hard-wearing surface for example by case-hardening said portion, or by coating it with a suitable alloy, such as that known under the registered trademark "Stellite," or by brazing or otherwise affixing thereto an appropriate block or strip of an appropriate metal or alloy.

As compared with valve-operating rockers and mountings of conventional construction, the pressed steel rocker and spherical mounting according to the present invention will be cheaper to manufacture in that the quantity of material used and the number of machining operations involved will be considerably reduced.

Having fully described my invention, what I claim and desire to secure by Letters Patent is:

1. Valve-operating mechanism for overhead valve internal combustion engines, comprising a valve-operating rocker formed as a steel pressing with an arcuate or convex valve contacting portion at one end and a part-spherical bearing at the other, and an adjustable spherical fulcrum upon which the said part-spherical bearing seats to vary the valve clearance, said rocker operating as a lever of the third order, the actuating cam operating upon it at a position between its ends.

2. Valve-operating mechanism according to claim 1, wherein the rocker is pressed from a sheet steel blank comprising a stem portion with an enlarged or disc-like portion at one end, the latter being pressed to form a hemi-spherical bearing and the stem portion being pressed into a channel section with the base of the channel at that end remote from the said bearing formed to part-cylindrical shape to afford the arcuate or convex valve contacting portion at that end, the channel section stem and the part-spherical bearing having their open sides presented both in the same direction.

3. Valve-operating mechanism according to claim 1, wherein the spherical fulcrum has a threaded stem which screws into the bore of a boss cast on the cylinder head, said stem being fitted with adjusting and lock nuts.

References Cited in the file of this patent

UNITED STATES PATENTS

| | | |
|---|---|---|
| 1,223,762 | Bugatti | Apr. 24, 1917 |
| 2,209,479 | Spencer | July 30, 1940 |
| 2,506,566 | Boyer | May 9, 1950 |